US006844716B1

(12) United States Patent
Lundberg et al.

(10) Patent No.: US 6,844,716 B1
(45) Date of Patent: Jan. 18, 2005

(54) BREAKAWAY UTILITY PEDESTAL WITH PROGRAMMABLE INTERNAL METERING FOR MARINE AND RECREATIONAL VEHICLES

(75) Inventors: Gordon K. Lundberg, Ochelata, OK (US); Adam G. Shelton, Claremore, OK (US)

(73) Assignee: HydroHoist International, Inc., Claremore, OK (US)

( * ) Notice: Subject to any disclaimer, the term of this patent is extended or adjusted under 35 U.S.C. 154(b) by 0 days.

(21) Appl. No.: 10/292,996

(22) Filed: Nov. 13, 2002

(51) Int. Cl.[7] .......................... G01R 21/06; H02B 1/04; H02B 5/02

(52) U.S. Cl. .......................... 324/142; 174/38; 174/50; 324/157; 361/641; 361/659

(58) Field of Search .......................... 324/107, 142, 324/157; 174/38, 50; 361/641, 659, 668, 669, 823

(56) References Cited

U.S. PATENT DOCUMENTS 3,761,780 A * 9/1973 Plummer .................... 361/663
4,785,376 A * 11/1988 Dively .................... 361/622
4,873,600 A * 10/1989 Vogele .................... 361/823
6,510,608 B1 * 1/2003 Marshall et al. .............. 29/869

* cited by examiner

*Primary Examiner*—Ernest Karlsen
(74) *Attorney, Agent, or Firm*—Frank J. Catalano

(57) ABSTRACT

A utility distribution pedestal for marine and recreational vehicles can be entirely separated and removed from its base without disturbing the service connections. Pedestals with different selections of receptacles can be quickly exchanged to change the service provided by any given pedestal location. Individual receptacle panels in the pedestal offering different combinations of receptacles can easily be added or exchanged after initial installation as utility needs change or for maintenance without any screw terminal wire removal. A metering system using four current transformers is controlled by an integrated mechanical jumper for switching the system into single or two phase configurations for one or two user readouts or a three-phase configuration for a one user readout. No pedestal disassembly or assembly is required to change these configurations. Remote monitoring for wireless metering and electromechanical counters may also be employed.

5 Claims, 5 Drawing Sheets

120
121
122
123
124
125
126
127
128
129
131
133
135
137
139
141
143
145
147
149
151
153
155
+12VDC
+5VDC
Vin
+Vout
ADJ

BREAKAWAY UTILITY PEDESTAL WITH PROGRAMMABLE INTERNAL METERING FOR MARINE AND RECREATIONAL VEHICLES

BACKGROUND OF THE INVENTION

This invention relates generally to utility services distribution centers and more particularly concerns pedestals supplying utility services for marine and recreational vehicles and the metering associated therewith.

Known utility pedestals supplying electrical power, telephone, cable TV and water service for marine and recreational vehicles hard wire their supply lines to the receptacles into which the users plugs are inserted. This includes individual conductors which sequentially connect to the supply line termination, the circuit breakers and the receptacles and return to the supply line termination. Similar hard wiring is also used to connect receptacles for TV/cable and telephones to their respective supply lines. While some of these units are constructed of separate base and upper pedestal housings, their hard wiring makes them monolithic or inseparable.

This monolithic construction has many drawbacks. For example, in bad weather it is not uncommon for a marine or recreational vehicle to move away from its supply pedestal sufficiently that connecting cables pull the pedestal from its base, damaging the service wiring and plumbing. Furthermore, since the pedestal components cannot be disassociated from the base without disassembly, they are generally left continuously exposed to weather damage during the off-season. And, if maintenance is required, the pedestal is typically out-of-service until the hard-wired changes can be completed. Then, too, the utility services provided at a given pedestal are unchangeable without disassembly and rewiring, so that each pedestal is essentially permanently dedicated to vehicles having a specific maximum utility service demand.

The problem of permanent dedication is further compounded by the conformation of presently known metering systems. Such meters use conventional current transformers as their source of current input with the transformers permanently configured for their particular application. The elements are either built into the meter or are connected externally by screw terminals or other splicing methods. Readouts are provided digitally by built in LCD or LED display modules or electromechanically by counters using stepper motor driven or pulse driven displays. Different meters are required for single, two and three phase applications and for each output associated therewith. In order to change from one meter function to another, the hard-wired meter must be replaced in the system. For example, assume that a marina has a shore power 30 A 120V three-wire receptacle with a single current transformer/single output meter unit housed in a box on a deck beside a transient slip. If a boat waiting to dock in the slip requires a 50 A 120/240V four-wire receptacle, the marine operator must completely remove the old meter and install a meter having two current transformers and a single output in order to accommodate the boat.

It is, therefore, an object of this invention to provide a utility pedestal for marine and recreational vehicles which is not hard-wired to incoming utility supply lines. Another object of this invention is to provide a utility pedestal for marine and recreational vehicles which has an outgoing utility supply line pedestal which is adapted for quick connect/disconnect to/from an incoming utility supply line base. A further object of this invention is to provide a utility pedestal for marine and recreational vehicles which has an outgoing utility supply line pedestal which disconnects from an incoming utility supply line base in response to displacement of the attached marine or recreational vehicle. Yet another object of this invention is to provide a utility pedestal for marine and recreational vehicles which has an outgoing utility supply line pedestal which can be quickly disconnected from an incoming utility supply line base for off-season storage and maintenance. It is also an object of this invention to provide a utility pedestal for marine and recreational vehicles which has interchangeable receptacle panels to permit changes in utility service capability of the pedestal. Still another object of this invention is to provide a utility pedestal for marine and recreational vehicles which has a single metering system adaptable to accommodate a variety of phase/user applications.

SUMMARY OF THE INVENTION

In accordance with the invention, a utility distribution pedestal for marine and recreational vehicles can be entirely separated and removed from its base without disturbing the service connections. Pedestals with different selections of receptacles can be quickly exchanged to change the service provided by any given pedestal location. Individual receptacle panels in the pedestal offering different combinations of receptacles can easily be added or exchanged after initial installation as utility needs change or for maintenance without any screw terminal wire removal.

A base for the pedestal is securely attached to a marine dock or ground based concrete slab or platform. AC power supply wires connect to terminals mounted in the base. A first mating component of a stab-type connector is connected to the terminals and extends the supply wires to a second mating component of the connector mounted at the bottom of the pedestal. The connector components are automatically disconnected when the pedestal is removed, intentionally or inadvertently, from the base. Receptacle panels containing circuit breakers and their associated power receptacles are mounted in the upper portion of the pedestal. A distribution buss and/or hard wired conductors transmit the AC power from the second mating component of the connector to other sets of stab-type connectors mounted behind each receptacle panel. All of the AC power passing through these panels is also transmitted through stab-type connectors. This allows the different configurations of receptacle panels to be interchangeably plug connected to the pedestal.

Incoming telephone and TV cables extend to first mating components of plugs mounted on the base. The second mating components of the plugs are connected to wires disposed on and extending through the pedestal for ultimate connection to the user's telephone and cable lines. The pedestal wires are sufficiently long to permit the telephone and TV cable connections to be manually mated before the pedestal is seated on the base.

The pedestal may incorporate a metering system, preferably having four current transformers controlled by an integrated mechanical jumperfor switching the current transformer circuits into single or two phase configurations for one or two user readouts or a three-phase configuration for a one user readout. No pedestal disassembly or assembly is required to change these configurations. The jumper is built into a circuit board on the interior of the meter in the pedestal so as to eliminate inadvertent reconfiguration of the system. In a single user application, the sum of usage measured by all four transformers is displayed. For a two-user application, the sum of usage measured by two transformers is indicated on one display and the sum of usage measured by the other two transformers is indicated on a second display. Remote monitoring for wireless metering and electro-mechanical counters may also be employed.

The pedestal can be rapidly installed and/or removed for storm conditions, end-of-season storage and repairs. The pedestal is readily adaptable for changes in utility requirements without rewiring.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
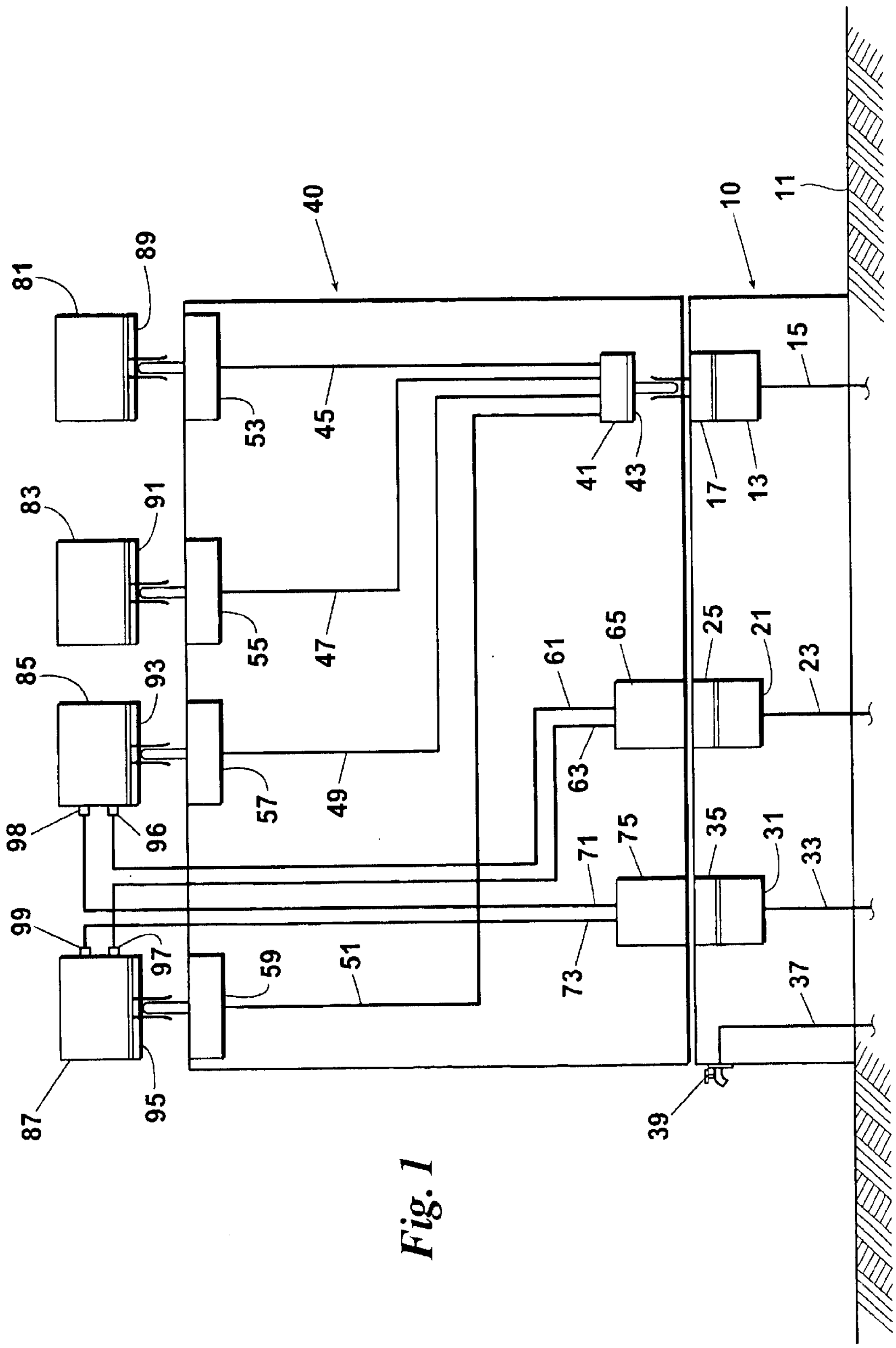
FIG. 1 is a one line/block diagram illustrating a preferred embodiment of the marine and recreational vehicle utility pedestal and base.

Turning first to FIG. 1, a preferred embodiment of a breakaway utility pedestal for marine and recreational vehicles is illustrated. A base 10 is fixed on a dock, slab, platform or the like 11. An AC power supply terminal 13 mounted in the base 10 is hard wired to an incoming AC power supply 15. A first mating component 17 of a stab connector mounted in the base 10 is electrically connected to the supply terminal 13.

A telephone terminal 21 can also be mounted in the base 10. The telephone terminal 21 is connected to an incoming telephone line 23. A first mating component 25 of a telephone connector mounted in the base 10 is electrically connected to the telephone terminal 21. In addition, a television cable terminal 31 can be mounted in the base 10. The cable terminal 31 is connected to an incoming television cable 33. A first mating component 35 of a television cable connector is mounted in the base 10 and electrically connected to the television cable terminal 31. Finally, the base 10 may also include an incoming water line 37 and faucet 39.

A pedestal 40 is adapted to be seated on the base 10. An AC power outlet terminal 41 is mounted in the pedestal 40. A second mating component 43 of the power stab connector is mounted in the pedestal 40 and hard wired to a main power outlet terminal 41. The mating components 17 and 43 of the stab connector are oriented for automatic mating engagement when the pedestal 40 is seated on the base 10. The main power outlet terminal 41 is connected by lines 45, 47, 49 and 51 to the first mating components 53, 55, 57 and 59 of several blade-type stab connectors. Each line 45, 47, 49 and 51 represents a harness of wires consisting of three-phase wires, a ground wire and a neutral wire.

If telephone service is desirable, telephone outlet lines 61 and 63 are disposed in the pedestal 40. A second mating component 65 of the telephone connector is connected to one end of the telephone outlet lines 61 and 63 for disposition in the pedestal 40. The telephone outlet lines 61 and 63 are at least sufficiently long as to permit manual mating engagement of the telephone connector components 25 and 65 before the pedestal 40 is seated on the base 10. If television service is desired, television cable outlet lines 71 and 73 are disposed in the pedestal 40. A second mating component 75 of the television cable connector is connected to one end of the cable outlet lines 71 and 73 for disposition in the pedestal 40. The television cable outlet lines 71 and 73 are at least sufficiently long as to permit manual mating engagement of the television cable connector components 35 and 75 before the pedestal 40 is seated on the base 10.

The prototype base 10 and pedestal 40 were made of polycarbonate but other materials can be used as well. The prototype base 10 was approximately 9.5"W×11.5"L×16"H and the prototype pedestal was approximately 19"W×22.5"L×27"H.

The mating stab-type connector components 53, 55, 57 and 59 allow different configurations of receptacle and circuit breaker panels 81, 83, 85 and 87 to be interchanged by use of mating stab-type connector components 89, 91, 93 and 95. As shown, for example, two of the panels 85 and 87 have been provided with plugs 96, 97, 98 and 99 for connection of the telephone lines 61 and 73 and television cables 71 and 73, respectively.

Figure 2:
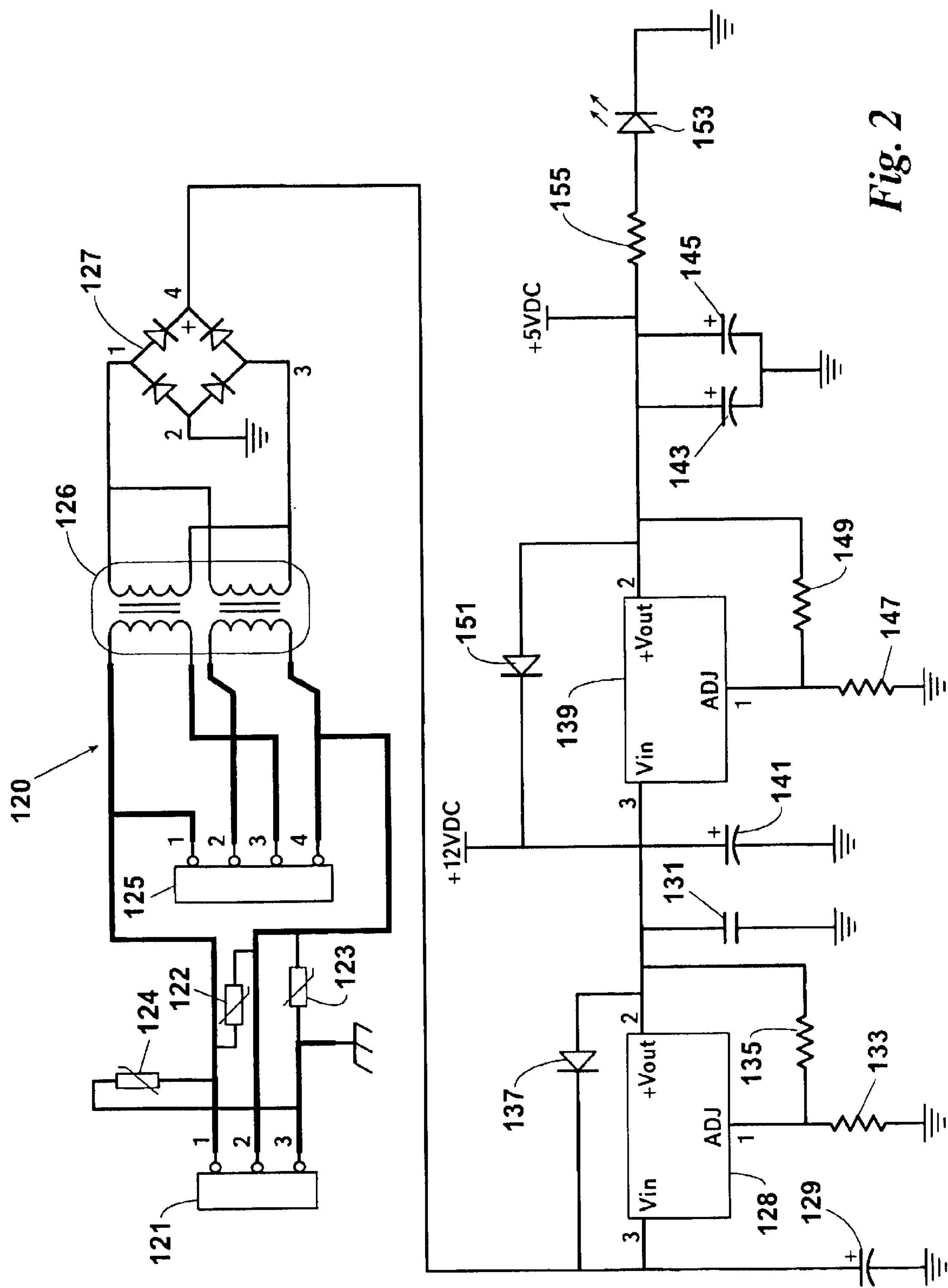
FIG. 2 is a schematic diagram of a preferred embodiment of the control circuit power supply of a metering system for use with the utility pedestal of FIG. 1.
Figure 3A:
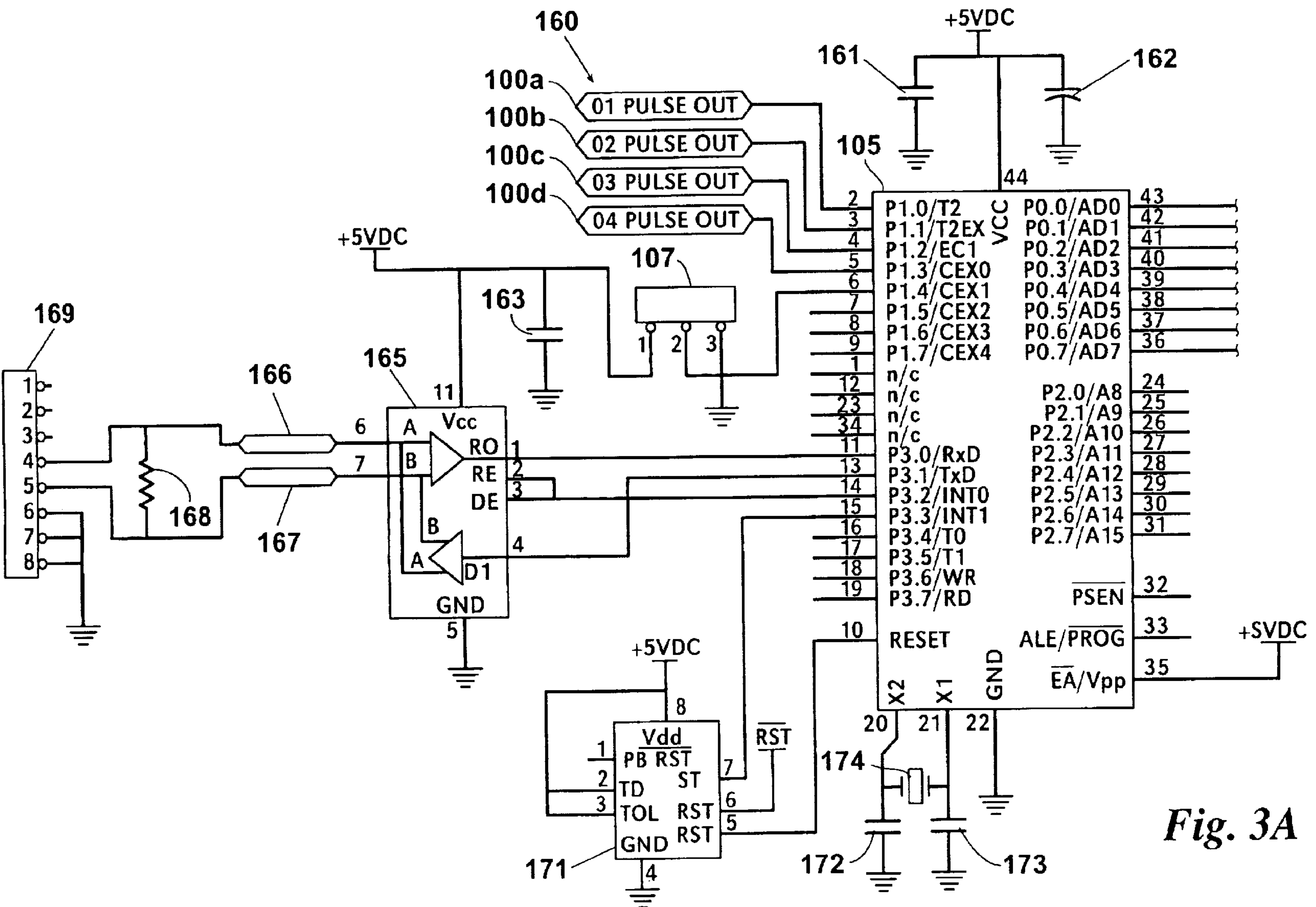
FIGS. 3A and 3B are schematic diagrams of a preferred embodiment of the programmable metering circuit of a metering system for use with the utility pedestal of FIG. 1.
Figure 3B:
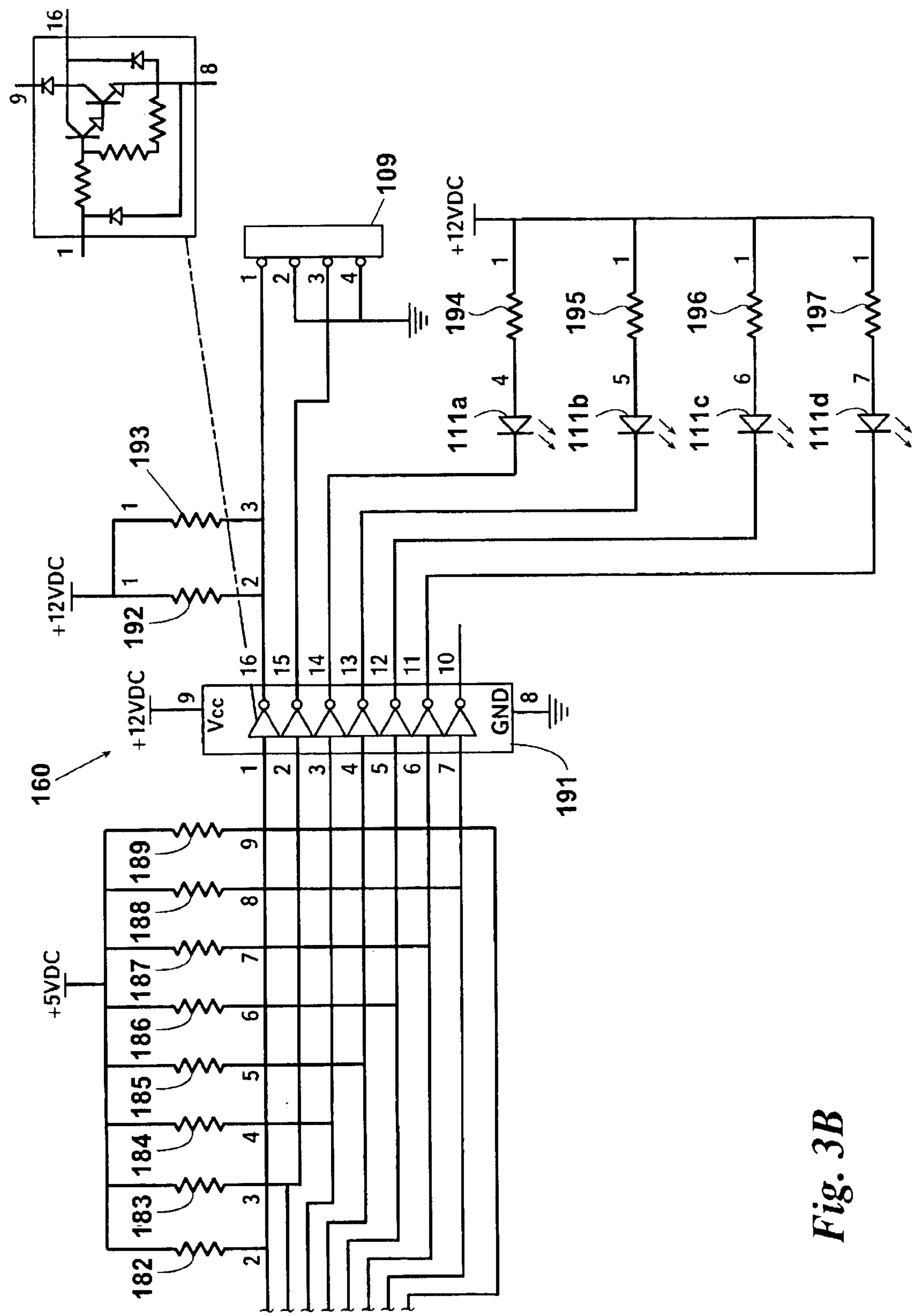
Figure 4:
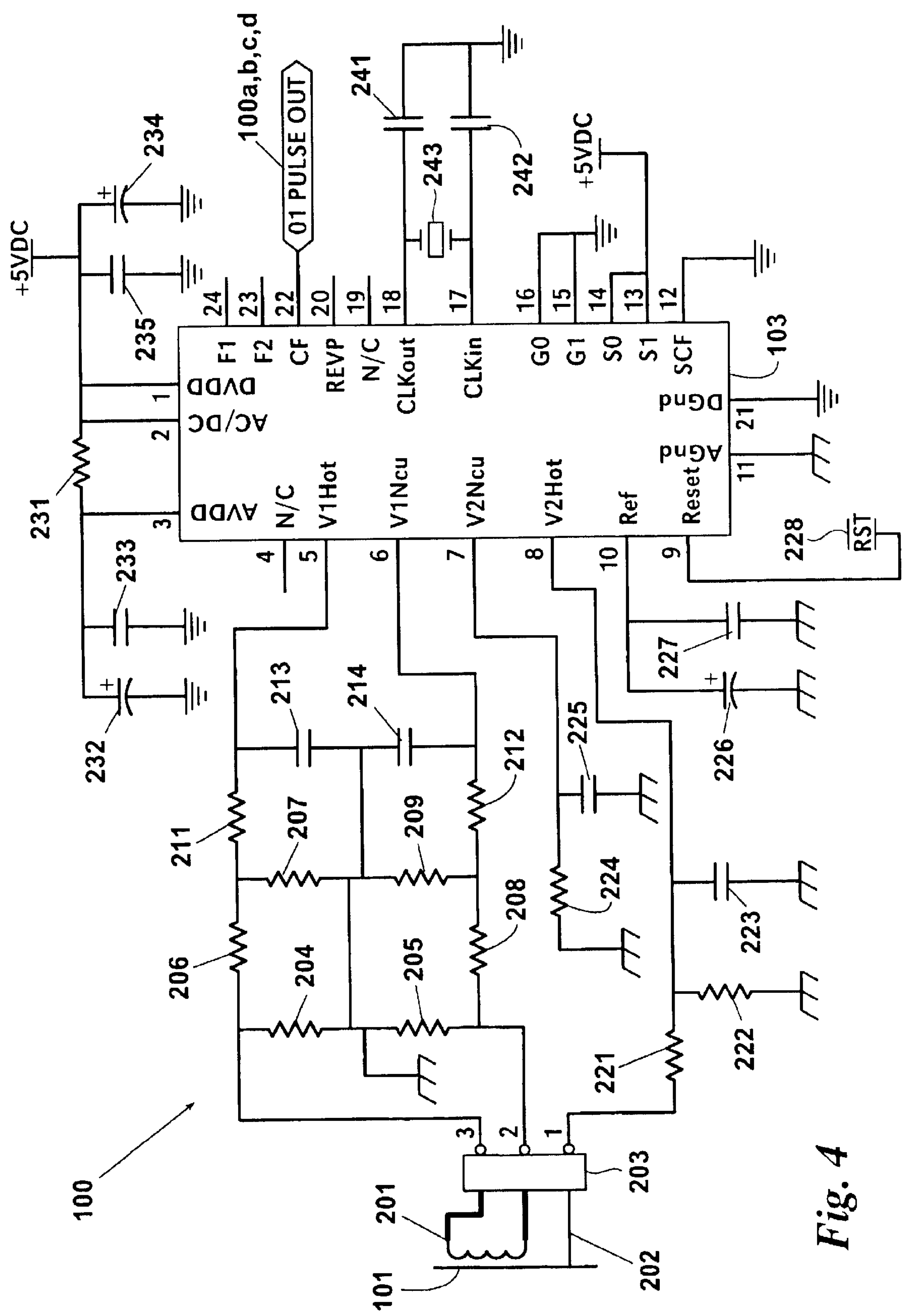
FIG. 4 is a schematic diagram of a preferred embodiment of a typical power calculation subcircuit of the programmable metering circuit of FIG. 3A.

Turning next to FIGS. 2–4, a preferred embodiment of a metering system for measuring power usage by users of the pedestal 40 is illustrated. Shown in FIG. 4 is a typical circuit 100 for deriving an analog voltage signal in response to current in a wire 101 carrying one phase of the AC power supply in lines 45, 47, 49 or 51 of the pedestal 40. Preferably, and as seen in FIG. 3A, four such signal deriving circuits 100 are employed. Preferably, at least one of these signal deriving circuits 100 will correspond to each phase in use in a pedestal 40. The outputs 100 a–d are fed to the power calculation circuits. Thus, the current carrying wire 101 of FIG. 4 may correspond to any phase wire of the power supply lines 45, 47, 49 and 51 in the pedestal. Each circuit 100 includes a power calculation chip 103 or other circuit components suitable for converting the analog voltage signal into a digital signal of frequency proportional to the product of the analog voltage signal and a reference current signal derived from the phase wire 101 from which the voltage signal is derived. As best seen in FIG. 3A, a programmable micro controller 105 or other suitable circuit components counts the pulses output from the power calculation chips 103. A jumper 107 enables the user to switch the programmable micro-controller 105 between a first configuration in which all of the pulses of all of the digital signals are summed and a second configuration in which all of the pulses of some of the digital signals are summed and all of the pulses of the remainder of the digital signals are summed. The first configuration is used when the meter serves a single user and the second configuration when the meter serves two users. The system also includes a receptacle 109 for connection to a display screen providing a visual indication of kilowatt hours of power usage in response to the pulse counts by the programmable micro-controller 105. A plurality of indicator lights 111*a*–*d* usually confirm whetherthe analog signal deriving circuits 100*a–d* from which the programmable micro-controller 105 is receiving pulses are operating.

Considering the metering system in greater detail, we turn to FIG. 2 illustrating the system power source 120. A junction box 121 receives the incoming power lines. For meters to be used in the United States, pins 1, 2 and 3 of the box 121 receive hot, neutral and ground wires, respectively. For European usage, pins 1, 2 and 3 of junction box 121 receive hot, hot and ground wires, respectively. The system is protected by surge protectors 122, 123 and 124. A connector 125 can be configured for 120 or 220 volt systems at 50 or 60 Hz. For European use in 220 volt AC systems, pins 2 and 3 are commonly connected. For U.S. use in 120 volt AC systems, pins 1 and 2 are commonly connected and pins 3 and 4 are commonly connected. A step-down transformer 126 reduces the system output voltage to 12 volts AC and a circuit 127 fully rectifies the output of the transformer 126. A converter 128 in conjunction with capacitors 129 and 131, resistors 133 and 135 and diode 137 converts the rectified signal into a DC signal and regulates the output at 12 volts DC. A second converter 139 in conjunction with capacitors 141, 143 and 145, resistors 147 and 149 and diode 151 further regulates the output to 5 volts DC. A light emitting diode 153 connected to the 5 volt output via a resistor 155 confirms that the power circuit is operable. The 12 volt DC output of the power circuit 120 serves the counter circuits of the meter while the 5 volt DC output serves the power calculation chips 103 and the programmable micro-controller 105, as will be hereinafter more fully explained.

Turning to FIGS. 3A and 3B, the counting circuit 160 of the metering system is illustrated. As earlier explained, the programmable micro-controller 105 receives inputs 100*a–d* from several analog voltage signal deriving circuits 100 which will be hereinafter explained in greater detail. Based on the status of the selector 107, the programmable micro-controller 105 will operate in either the first configuration in which it will count all pulses of all digital signals and the second configuration in which it will provide a count of all pulses of some of the digital signals and another count of all the pulses of the remainder of the digital signals. In the embodiment shown, if points 1 and 2 of the selector 107 are commonly connected, the programmable micro-controller 105 will operate in the first configuration and if the points 2 and 3 of the selector 107 are commonly connected the programmable micro-controller 105 will operate in the second configuration giving separate read-outs for two users. Capacitors 161 and 162 isolate the programmable micro-controller 105 and capacitor 163 isolates the selector 107 from the 5 VDC power circuit 120. A conversion chip 165 connected through interfaces 166 and 167 and across a resistor 168 to a remote monitoring jack 169 which allows external equipment to be connected for remote monitoring via a wireless network. A reset chip 171 ties the power calculation chips 103 to the programmable micro-controller 105. Capacitors 172 and 173 and crystal oscillator 174 are the timing circuitry for the programmable controller 105.

The outputs of the programmable micro-controller 105 are connected to resistors 182–189 and a transistor array 191 in the event that a 12 volt display is to be used. Resistors 192 and 193 are connected between the 12 volt source and the inputs to the receptacle 109 and the outputs of the transistor array 191. The arrangement of each of the transistor circuits in the array 191 is illustrated with respect to the first such transistor circuit of the array 191. Light emitting diodes 111 a–d are connected via resistors 194, 195, 196 and 197 between the transistor array 191 and the 12 VDC power source to indicate the operation of the analog voltage signal deriving circuits 100 as hereinbefore noted. If a 5 volt counter display is used, the transistor array 191 and associated 12 volt circuits are unnecessary.

Turning now to FIG. 4, the typical circuit 100 for deriving an analog voltage signal can be explained in greater detail. A current transformer 201 monitors a selected wire 101 which may be any of the phase wires in the power supply lines 45, 47, 49 and 51 in the pedestal 40. Another wire 202 is connected directly to the wire 101 monitored by the current transformer 201. The output of the current transformer 201 is connected via the junction box 203 to a network of resistors 204, 205, 206, 207, 208, 209, 211 and 212 and capacitors 213 and 214. Resistors 204 and 205 convert the output of the current transformer 201 to a voltage signal. Resistors 206 and 207 and 208 and 209 knock the voltage down and resistors 211 and 212 and their associated capacitors 213 and 214 limit the resulting signal to protect the power calculation chip 103. Resistors 221 and 222 are connected to the lead wire 202 via the junction box 203 and along with capacitor 223 provide a reference voltage to the power calculation chip 103. Resistor 224 and capacitor 225 are connected to the neutral point on the power calculation chip 103. Capacitors 226 and 227 connected to the power calculation chip 103 are configured to set the internal circuitry of the chip 103. The chip reset circuit 228 connects the power calculation chip 103 to the programmable micro-controller 105. A resistor 231 and capacitors 232 and 233 and 234 and 235 are configured as power isolation circuits from the 5 volt DC power circuit 120. Capacitors 241 and 242 and crystal oscillator 243 form the clock circuit for the power calculation chip 103.

The prototype meter enclosure was approximately 3"W×4"L×1.5"H and was fastened to the pedestal with screws.

The following table specifies the components in relation to the element numbers referenced herein. The components specified have been used in a successful prototype of the pedestal and the metering system:

| Element No. | Component | Spec |
|---|---|---|
| 13 | AC power terminal | Ilsco AU-350; Ilsco AU-2/0 lugs |
| 17 | stab connector component | Ilsco C24 fuse clip |
| 21 | telephone terminal | Leviton 40274-1 |
| 25 | telephone connector component | Leviton 40274-1 |
| 31 | TV cable terminal | Leviton 409872 |
| 35 | TV cable connector component | Leviton 409872 |
| 41 | AC power terminal | stab |
| 43, 53, 55, 57, 59 | stab connector component | stab |
| 65 | telephone connector component | RJ11 |
| 75 | TV cable connector component | male type F RG59 coax connector |
| 89, 91, 93, 95 | stab connector component | Ilsco C17; circuit breakers such as Seimens Q130 |
| 96, 97 | telephone plug | Hubbell PH6624 |
| 98, 99 | TV cable plug | male type F RG59 coax connector |
| 103 | power calculation chip | ADE 7755 |
| 105 | programmable micro-controller | 87 C51-PLC44 |
| 107 | jumper/selector | 5PDT |
| 109, 121, 203 | junction box | amp connector |
| 111 a–d | LED's | RED |
| 122, 123, 124 | surge protector | V 270 LA20 |
| 125 | junction box | CON 4/D.156 |

-continued

| Element No. | Component | Spec |
|---|---|---|
| 126 | current transformer | SPW-354D; 12 V 90 mA |
| 127 | rectifier circuit diodes | 4C DB1 RB14Y |
| 128 | pulse to DC signal converter | LM 317T REG1 |
| 129 | capacitor | 2200 μF 25 V |
| 131 | capacitor | 0.1 μF |
| 133 | resistor | 3.01 K 1% |
| 135 | resistor | 432 1% |
| 137 | diode | IN 4007 |
| 139 | pulse to DC signal converter | LM317T REG2 |
| 141 | capacitor | 470 μF 16 V |
| 143 | capacitor | 100 μF 10 V |
| 145 | capacitor | 2.2 μF 25 V |
| 147 | resistor | 499 1% |
| 149 | resistor | 1.5 K 1% |
| 151 | diode | IN 4007 |
| 153 | LED | red |
| 155 | resistor | 470 |
| 161 | capacitor | .1 μF |
| 162 | capacitor | 2.2 μF 10 V |
| 163 | capacitor | 0.1 μF |
| 165 | wireless converter chip | MAX 483ECPA |
| 166 | mating jack | RS485-1 |
| 167 | mating jack | RS485 |
| 168 | resistor | 120 |
| 169 | jack | CN RJ45-8R |
| 171, 228 | reset | ADM1232AN |
| 172 | capacitor | 27PF |
| 173 | capacitor | 27PF |
| 174 | crystal oscillator | 11.592 Mhz |
| 182, 183, 184, 185, 186, 187, 188, 189 | resistor | 1 OK |
| 191 | transistor array | ULN2004A |
| 192, 193, 194, 195, 196, 197 | resistor | 1 K |
| 201 | current transformer | 1 Kturn |
| 204, 205 | resistor | 4.7 |
| 206 | resistor | 2.2 K |
| 207 | resistor | 1 K |
| 208 | resistor | 2.2 K |
| 209, 211, 212 | resistor | 1 K |
| 213, 214 | capacitor | 0.033 μF |
| 221 | resistor | 1 M |
| 222 | resistor | 1 K |
| 223 | capacitor | 0.033 μF |
| 224 | resistor | 1 K |
| 225 | capacitor | 0.033 μF |
| 226 | capacitor | 10 μF 16 V |
| 227 | capacitor | 0.1 μF |
| 231 | resistor | 10 |
| 232 | capacitor | 2.2 μFT |
| 233 | capacitor | 0.1 μF |
| 234 | capacitor | 10 μF 6.3 V |
| 235 | capacitor | 0.1 μF |
| 241 | capacitor | 27 pF |
| 242 | capacitor | 27 pF |
| 243 | crystal oscillator | 1 Mhz |

The protoype metering system using the above identified components was found to be accurate within 0.3%.

While the preferred embodiment of the pedestal incorporates the metering system herein disclosed, the pedestal need not necessarily include the metering system. Conversely, while the preferred embodiment of the metering system has been described in relation to its application in the utility pedestal, the metering system may be used in a variety of applications apart from the pedestal. Such applications may include, for example, apartment complexes, construction sites, industrial plants and the like.

Thus, it is apparent that there has been provided, in accordance with the invention, a utility pedestal for marine and recreational vehicles that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A breakaway utility pedestal for marine and recreational vehicles comprising a base adapted to be fixed to a platform, an AC power supply terminal mounted in said base and adapted to be hard wired to an incoming AC power supply, a first mating component of a first stab connector mounted in said base and electrically connected to said supply terminal, a pedestal adapted to be sealed on said base and a second mating component of said first stab connector mounted in said pedestal nd hard wired to a power distribution system having a multiplicity of stab connectors for receiving mating stab connectors of a multiplicity of interchangeable power outlets, said mating components of said first stab connector being oriented for automatic mating engagement when said pedestal is sealed on said base and said mating components of said multiplicity of stab connector being oriented for a automatic mating engagement when said interchangeable power outlets are seated on said pedestal.

2. A pedestal according to claim 1 further comprising a telephone terminal mounted in said base and adapted to be connected to an incoming telephone line, a first mating component of a telephone connector mounted in said base and electrically connected to said telephone terminal, a telephone outlet line disposed in said pedestal and a second mating component of said telephone connector disposed in said pedestal, said telephone outlet line being at least sufficiently long as to permit manual mating engagement of said telephone connector components before said pedestal is seated on said base.

3. A pedestal according to claim 1 further comprising a television cable terminal mounted in said base and adapted to be connected to an incoming television cable, a first mating component of a television cable connector mounted in said base and electrically connected to said television cable terminal, a television cable outlet line disposed in said pedestal and a second mating component of said television cable connector disposed in said pedestal, said television cable outlet line being at least sufficiently long as to permit manual mating engagement of said television cable connector components before said pedestal is scaled on the base.

4. A pedestal according to claim 3 further comprising a telephone terminal mounted in said base and adapted to be connected to an incoming telephone line, a first mating component of a telephone connector mounted in said base and electrically connected to said telephone terminal, a telephone outlet line disposed in said pedestal and a second mating component of said telephone connector disposed in said pedestal, said telephone outlet line being at least sufficiently long as to permit manual mating engagement of said telephone connector components before said pedestal is seated on said base.

5. A pedestal according to claim 1 further comprising a plurality of means for deriving an analog voltage signal in response to current inn a phase wire carrying one phase of said AC power supply, at least one said deriving means corresponding to a wire for each phase in use, a plurality of means for deriving reference voltage signals, one from each said phase wire from which said analog voltage signals are derived, a plurality of means for converting said analog voltage signal into a digital signal of frequency proportional to the product of the corresponding ones of said analog voltage signals and said reference signals, one said converting means corresponding to each said deriving means, means for counting pulses of said digital signals and means for switching said counting means between a first configuration providing a count of all pulses of all of said digital signals and a second configuration providing a first count of all pulses of some of id digital signals and a second count of all pulses of a remainder of said digital signals.

* * * * *